US011218305B2

(12) United States Patent
Zhang et al.

(10) Patent No.: US 11,218,305 B2
(45) Date of Patent: *Jan. 4, 2022

(54) BLOCKCHAIN AUTHORIZATION INFORMATION GENERATION (71) Applicant: Advanced New Technologies Co., Ltd., George Town (KY)

(72) Inventors: Yixiang Zhang, Hangzhou (CN); Jun Gu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,232

(22) Filed: Apr. 23, 2021

(65) Prior Publication Data
US 2021/0250168 A1 Aug. 12, 2021

Related U.S. Application Data (63) Continuation of application No. 17/035,408, filed on Sep. 28, 2020, now Pat. No. 10,992,465, which is a
(Continued)

(30) Foreign Application Priority Data

Apr. 19, 2019 (CN) .......................... 201910318833.5

(51) Int. Cl.
*H04L 29/06* (2006.01)
*H04L 9/08* (2006.01)
*H04L 9/06* (2006.01)
*H04L 9/32* (2006.01)

(52) U.S. Cl.
CPC .......... *H04L 9/0863* (2013.01); *H04L 9/0643* (2013.01); *H04L 9/3247* (2013.01); *H04L 9/3268* (2013.01); *H04L 2209/38* (2013.01)

(58) Field of Classification Search
CPC . H04L 2209/38; H04L 9/3239; H04L 9/0637; H04L 2209/56; G06Q 20/401
(Continued)

(56) References Cited

U.S. PATENT DOCUMENTS 10,790,973 B2 9/2020 Zhang et al.
10,992,465 B2 4/2021 Zhang et al.
(Continued)

FOREIGN PATENT DOCUMENTS

CN 105701372 6/2016
CN 107426157 12/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Evans Desrosiers
(74) *Attorney, Agent, or Firm* — Fish & Richardson P.C.

(57) ABSTRACT

A computer-implemented method includes: receiving, by a platform including one or more computing devices, a blockchain authorization information generation request from a client, in which the blockchain authorization information generation request includes a target blockchain identifier and user information; determining, based on the target blockchain identifier, a target blockchain; determining a blockchain parameter of the target blockchain, in which the blockchain parameter indicates one or more requirements for authorization information used to join the target blockchain; generating blockchain authorization information based on the blockchain parameter and the user information, in which the blockchain authorization information conforms
(Continued)

to the one or more requirements; and sending the blockchain authorization information to the client.

21 Claims, 8 Drawing Sheets

Related U.S. Application Data continuation of application No. 16/803,807, filed on Feb. 27, 2020, now Pat. No. 10,790,973, which is a continuation of application No. PCT/CN2020/070838, filed on Jan. 8, 2020.

(58) Field of Classification Search
USPC .......................................................... 380/44
See application file for complete search history.

(56) References Cited

U.S. PATENT DOCUMENTS

| | | | | |
|---|---|---|---|---|
| 2019/0205563 | A1* | 7/2019 | Gonzales, Jr. | ........ H04L 9/0637 |
| 2019/0238316 | A1* | 8/2019 | Padmanabhan | ....... H04L 9/3297 |
| 2019/0288843 | A1 | 9/2019 | Bonnel | |
| 2020/0092091 | A1* | 3/2020 | Muller | .................... G06F 16/27 |
| 2020/0204364 | A1 | 6/2020 | Zhang et al. | |
| 2021/0014055 | A1 | 1/2021 | Zhang et al. | |

FOREIGN PATENT DOCUMENTS

| | | |
|---|---|---|
| CN | 108111314 | 6/2018 |
| CN | 108933667 | 12/2018 |
| CN | 109067543 | 12/2018 |
| CN | 110020869 | 7/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln No. PCT/CN2020/070838, dated Apr. 8, 2020, 16 pages (with partial English translation).

* cited by examiner

Country Name (2 letter code) [] : CN
State or Province Name (full name) [] : Zhejiang
Locality Name (eg, city) [] : Hangzhou
Organization Name (eg, company) [] : Antfinancial
Organization Unit Name (eg, section) [] : IT
Common Name (eg, fully qualified host name) [] : alipay.com
Email Address [] :

BLOCKCHAIN AUTHORIZATION INFORMATION GENERATION

CROSS-REFERENCE TO RELATED APPLICATIONS

This application is a continuation of and claims the benefit of priority of U.S. patent application Ser. No. 17/035,408, filed Sep. 28, 2020, which is a continuation of and claims the benefit of priority of U.S. patent application Ser. No. 16/803,807, filed Feb. 27, 2020, which is a continuation of PCT Application No. PCT/CN2020/070838, filed on Jan. 8, 2020, which claims priority to Chinese Patent Application No. 201910318833.5, filed on Apr. 19, 2019, and each application is herein incorporated by reference in their entirety.

TECHNICAL FIELD

The present disclosure relates to the field of blockchain technologies, and specifically, to a method, an apparatus, and a system for generating blockchain authorization information.

BACKGROUND

A consortium blockchain is a type of blockchain, and each blockchain node of the consortium blockchain is formed by a corresponding institution or organization. Institutions or organizations that participate in the consortium blockchain can be authorized to join corresponding blockchain networks, form a consortium with the same services, and jointly maintain the blockchain operation.

SUMMARY

In view of the above, the present disclosure provides a method, an apparatus, and a system for generating blockchain authorization information. According to the method, the apparatus, and the system, authorization information can be generated for each blockchain node by using a professional platform, so as to improve security and reliability of the generated authorization information.

An aspect of the present disclosure provides a method for generating blockchain authorization information, including: receiving a blockchain authorization information generation request that is sent by a client and that is used to request to generate blockchain authorization information, where the blockchain authorization information generation request includes a target blockchain identifier and user information; obtaining a blockchain parameter that matches the target blockchain identifier; and generating the blockchain authorization information based on the obtained blockchain parameter and the user information.

Optionally, in an example, the method can further include: sending the generated blockchain authorization information to the client.

Optionally, in an example, generating the blockchain authorization information based on the obtained blockchain parameter and the user information can include: determining, based on the obtained blockchain parameter, a password generation algorithm used to generate the blockchain authorization information; and generating the blockchain authorization information based on the user information by using the determined password generation algorithm.

Optionally, in an example, the blockchain authorization information includes a blockchain identity certificate, and generating the blockchain authorization information based on the user information by using the determined password generation algorithm can include: generating a blockchain identity certificate request based on the user information by using the determined password generation algorithm, so as to use the blockchain identity certificate request as the blockchain identity certificate.

Optionally, in an example, the blockchain authorization information includes a blockchain identity certificate, and generating the blockchain authorization information based on the user information by using the determined password generation algorithm can further include: sending the blockchain identity certificate request to an authorization authentication server for signature authentication; and receiving a signature-authenticated blockchain identity certificate request as the blockchain identity certificate from the authorization authentication server.

Optionally, in an example, the blockchain identity certificate request is sent to the authorization authentication server after being approved by a blockchain administrator.

Optionally, in an example, the blockchain authorization information further includes a private key, and generating the blockchain authorization information based on the user information by using the determined password generation algorithm includes: generating the private key based on the user information by using the determined password generation algorithm.

Optionally, in an example, the blockchain authorization information generation request further includes private key encryption information, and the method can further include: encrypting the private key by using the private key encryption information.

Optionally, in an example, the blockchain parameter can be determined based on a service security level of the target blockchain.

Another aspect of the present disclosure provides an apparatus for generating blockchain authorization information, including: a generation request receiving unit, configured to receive a blockchain authorization information generation request that is sent by a client and that is used to request to generate blockchain authorization information, where the blockchain authorization information generation request includes a target blockchain identifier and user information; a blockchain parameter acquisition unit, configured to obtain a blockchain parameter that matches the target blockchain identifier; and an authorization information generation unit, configured to generate the blockchain authorization information based on the obtained blockchain parameter and the user information.

Optionally, in an example, the apparatus can further include an authorization information sending unit, configured to send the generated blockchain authorization information to the client.

Optionally, in an example, the authorization information generation unit can include: a password generation algorithm determining module, configured to determine, based on the obtained blockchain parameter, a password generation algorithm used to generate the blockchain authorization information; and an authorization information generation module, configured to generate the blockchain authorization information based on the user information by using the determined password generation algorithm.

Optionally, in an example, the blockchain authorization information includes a blockchain identity certificate, and the authorization information generation module can include: a certificate request generation submodule, configured to generate a blockchain identity certificate request based on the user information by using the determined password generation algorithm, so as to use the blockchain identity certificate request as the blockchain identity certificate.

Optionally, in an example, the blockchain authorization information includes a blockchain identity certificate, and the authorization information generation module can further include: a certificate request sending submodule, configured to send the blockchain identity certificate request to an authorization authentication server for signature authentication; and a certificate request receiving submodule, configured to receive a signature-authenticated blockchain identity certificate request as the blockchain identity certificate from the authorization authentication server.

Optionally, in an example, the blockchain identity certificate request is sent to the authorization authentication server after being approved by a blockchain administrator.

Optionally, in an example, the blockchain authorization information can further include a private key, and the authorization information generation module can further include: a private key generation submodule, configured to generate the private key based on the user information by using the determined password generation algorithm.

Optionally, in an example, the blockchain authorization information generation request further includes private key encryption information, and the apparatus can further include: a private key encryption unit, configured to encrypt the private key by using the private key encryption information.

Another aspect of the present disclosure further provides a system for generating blockchain authorization information, including the apparatus as described above; and an authorization authentication server, configured to: after receiving a blockchain identity certificate request from the apparatus and performing signature authentication on the blockchain identity certificate request, send a signature-authenticated blockchain identity certificate request to the apparatus.

Another aspect of the present disclosure further provides a computing device, including at least one processor; and a memory, where the memory stores instructions, and when the instructions are executed by the at least one processor, the at least one processor performs the previous method.

Another aspect of the present disclosure further provides a non-transient machine readable storage medium on which executable instructions are stored, where when being executed, the instructions cause the machine to perform the method described above.

According to the method, apparatus, and system of the present disclosure, when a blockchain authorization information generation request sent by a client is received, a blockchain parameter that matches a target blockchain identifier is obtained, and blockchain authorization information is generated based on the obtained parameter. Therefore, a professional platform can be used to generate the authorization information for the client, which can provide convenience for the client, use software and hardware resources of the platform, and is not limited to software and hardware of the client. As such, security and reliability of the generated authorization information can be improved.

By using the method, apparatus, and system in the present disclosure, the generated blockchain authorization information is sent to the client, so the client does not need to obtain the authorization information by itself, thereby further improving convenience of the client.

By using the method, apparatus, and system of the present disclosure, authorization information is generated by using a password generation algorithm determined based on an obtained blockchain parameter, and the method, apparatus, and system can be adapted to a corresponding blockchain to generate secure and reliable authorization information.

By using the method, apparatus, and system in the present disclosure, a blockchain identity certificate request is generated by using an authoritative platform, so the blockchain identity certificate request generated by the authoritative platform can be used as a blockchain identity certificate, and no longer needs to be sent to another authentication institution for authentication, thereby improving authorization information generation efficiency and saving communication resources.

By using the method, apparatus, and system in the present disclosure, a generated blockchain identity certificate request is sent to an authorization authentication server for signature authentication, so security of the blockchain identity certificate can be further improved by using a signature of the authorization authentication server.

By using the method, apparatus, and system in the present disclosure, a private key is encrypted by using private key encryption information sent by a client, so security of the private key can be ensured, and the corresponding private key can be successfully obtained by the client.

BRIEF DESCRIPTION OF DRAWINGS

Further understanding of the essence and advantages of the present disclosure can be realized by referring to the following accompanying drawings. In the accompanying drawings, similar components or features can have the same reference numerals. The accompanying drawings are used to provide a further understanding of the implementations of the present disclosure, constitute a part of the present specification, and together with the following specific implementations are used to explain the implementations of the present disclosure, but do not constitute a limitation on the implementations of the present disclosure. In the accompanying drawings.

DESCRIPTION OF IMPLEMENTATIONS

The subject matter described here will be discussed below with reference to example implementations. It should be understood that these implementations are merely discussed to enable a person skilled in the art to better understand and implement the subject matter described in the present specification, and are not intended to limit the protection scope, applicability, or examples described in the claims. The functions and arrangements of the elements under discussion can be changed without departing from the protection scope of the present disclosure. Various processes or components can be omitted, replaced, or added in the examples as needed. In addition, features described for some examples can also be combined in other examples.

As used in the present specification, the term "include" and its variant are inclusive, meaning "including but not limited to". The term "based on" means "based on at least a part". The terms "one implementation" and "an implementation" indicate "at least one implementation". The term "another implementation" indicates "at least one other implementation". The following can include other definitions, whether explicit or implicit. Unless explicitly stated in the context, the definition of a term is consistent throughout the present specification.

The method, apparatus, and system for generating blockchain authorization information in the present disclosure are now described with reference to the accompanying drawings.

Figure 1:
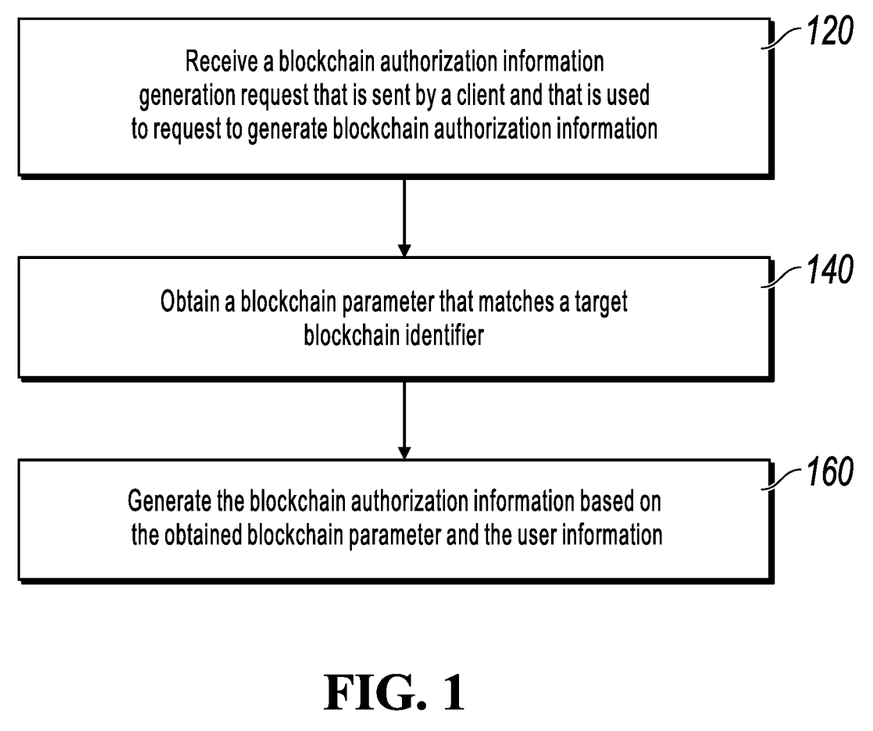
FIG. 1 is a flowchart illustrating a method for generating blockchain authorization information, according to an implementation of the present disclosure.

FIG. 1 is a flowchart illustrating a method for generating blockchain authorization information, according to an implementation of the present disclosure.

As shown in FIG. 1, at block 120, receive a blockchain authorization information generation request that is sent by a client and that is used to request to generate blockchain authorization information, where the blockchain authorization information generation request includes a target blockchain identifier and user information. The client can be a server of any institution or organization that wants to join the target blockchain. After joining the target blockchain, the client becomes a blockchain node in the target blockchain.

The target blockchain identifier is used to identify the target blockchain that the client wants to join. Different blockchains have different requirements on authorization information. Therefore, when requesting to generate the blockchain authorization information, the client can indicate the target blockchain that the client wants to join in the blockchain authorization information generation request. The target blockchain identifier can be, for example, a number or a name of the target blockchain. The user information is used to generate the blockchain authorization information. For example, the user information can be information such as a country, a province, a city, a company name, or a fully qualified domain name (FQDN) of a user. The user information can identify a corresponding client, so the generated blockchain information can be distinguished from that of other clients. Different blockchains can require different user information when generating blockchain authorization information.

When the blockchain authorization information generation request is received, at block 140, obtain a blockchain parameter that matches the target blockchain identifier. The blockchain parameter can be, for example, a blockchain version number, an MPT tree component, a key format, a key security level, key complexity, etc. The key format can be, for example, a key length. The system can interconnect with each blockchain network to obtain parameters of each blockchain. In addition, the parameters of each blockchain can also be stored locally. In an example, the blockchain parameter can be determined based on a service security level of the target blockchain. For example, parameters such as a key length and key complexity can be determined based on the security level of the target blockchain.

When the client locally generates the blockchain authorization information, these parameters need to be entered manually, which is inefficient and complicated for the client. By matching the blockchain parameters based on the target blockchain, efficiency of authorization information can be improved, convenience is provided to the client, and an error probability of an authorization generation process is reduced.

For a consortium blockchain scenario, a client requesting to join the target blockchain can have been reviewed by the target blockchain. That is, a management organization of the target blockchain can review, based on each review standard, the client requesting to join the blockchain, for example, review the fund status, credit status, operation status, technical capability, and licensed business scope of the client. The client is allowed to join the target blockchain only if the client satisfies requirements. The client can issue a blockchain authorization information generation request when the client is approved to join.

After the blockchain parameter is matched, at block 160, generate the blockchain authorization information based on the obtained blockchain parameter and the user information. Thus, authorization information that conforms to the target blockchain and can identify a client identity can be generated.

For example, the method for generating blockchain authorization information provided in this implementation of the present disclosure can be performed by an authorization information generation server. The authorization information generation server can further be configured with a key security apparatus, for example, an HSM or an SGX. The key security apparatus can provide a secure environment for authorization information generation, prevent a potential security risk caused by a factor such as a hacker attack, and improve reliability of the authorization information generation process. However, because of relatively high hardware costs, it is difficult to deploy the hardware separately on each client.

Figure 2:
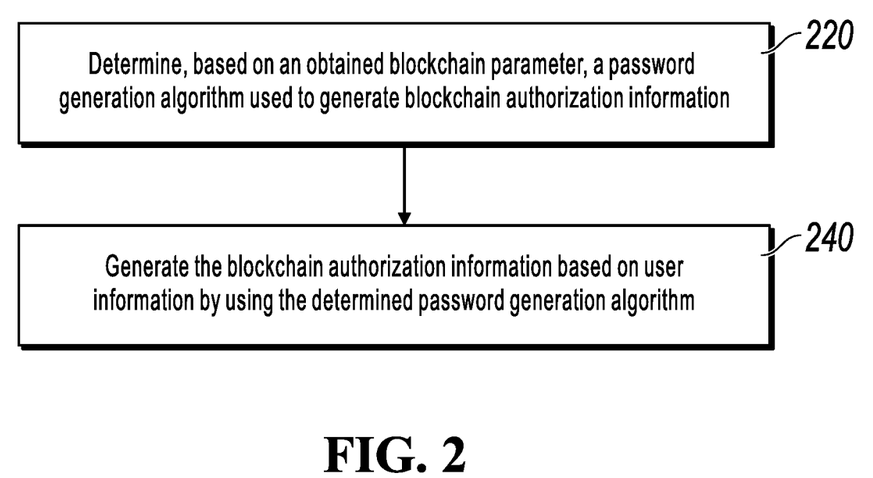
FIG. 2 is a flowchart illustrating an example authorization information generation process in a method for generating blockchain authorization information, according to an implementation of the present disclosure.

FIG. 2 is a flowchart illustrating an example authorization information generation process in a method for generating blockchain authorization information, according to an implementation of the present disclosure.

As shown in FIG. 2, at block 220, determine, based on the obtained blockchain parameter, a password generation algorithm used to generate the blockchain authorization information. The password generation algorithm can be, for example, an EC algorithm or an RSA algorithm. In an example, a corresponding password generation algorithm can be determined based on a key format, a security level, etc. that are required by the target blockchain. For example, for some blockchain projects, a China-developed encryption algorithm can be selected. Key formats such as key lengths generated by various password generation algorithms can also be different. Therefore, the password generation algorithm can be further determined based on a key format required by the target blockchain.

After the password generation algorithm is determined, at block 240, use the determined password generation algorithm to generate the blockchain authorization information based on the user information.

When the authorization information is generated by using a professional platform, hardware of a sufficient scale can be deployed at the platform, so the password generation algorithm can generate a more secure key. For example, software and hardware resources on the platform can enable a random degree of a random number generated in a key generation process to reach a real random level, and it is difficult to crack authorization information generated based on the random number generated in the key generation process. When a client locally generates a key, because hardware resources are limited, a random degree of a random number generated may not reach a real random level, and therefore, a generated key has relatively low security.

The generated blockchain authorization information can be sent to the client, or the client can access a corresponding authorization information generation platform to obtain the generated blockchain authorization information. After obtaining the blockchain authorization information, the client can join the target blockchain by using the blockchain authorization information to read and write transactions in the target blockchain.

The blockchain authorization information can include a blockchain identity certificate, and can further include a private key corresponding to the blockchain identity certificate. The private key is used by the client to encrypt a transaction to be sent to the target blockchain. The blockchain identity certificate is used to prove the identity of the client, and only a client that has the blockchain identity certificate is accepted as a valid blockchain node by other participants in the target blockchain. When joining the target blockchain, the client can distribute the blockchain identity certificate to other participants of the target blockchain, so the other participants of the target blockchain decrypt an encrypted transaction sent by the client. The blockchain identity certificate includes a public key of the client, and further includes user information of the client. The following describes a process of generating the blockchain identity certificate and the private key with reference to FIG. 3 to FIG. 5.

Figure 3:
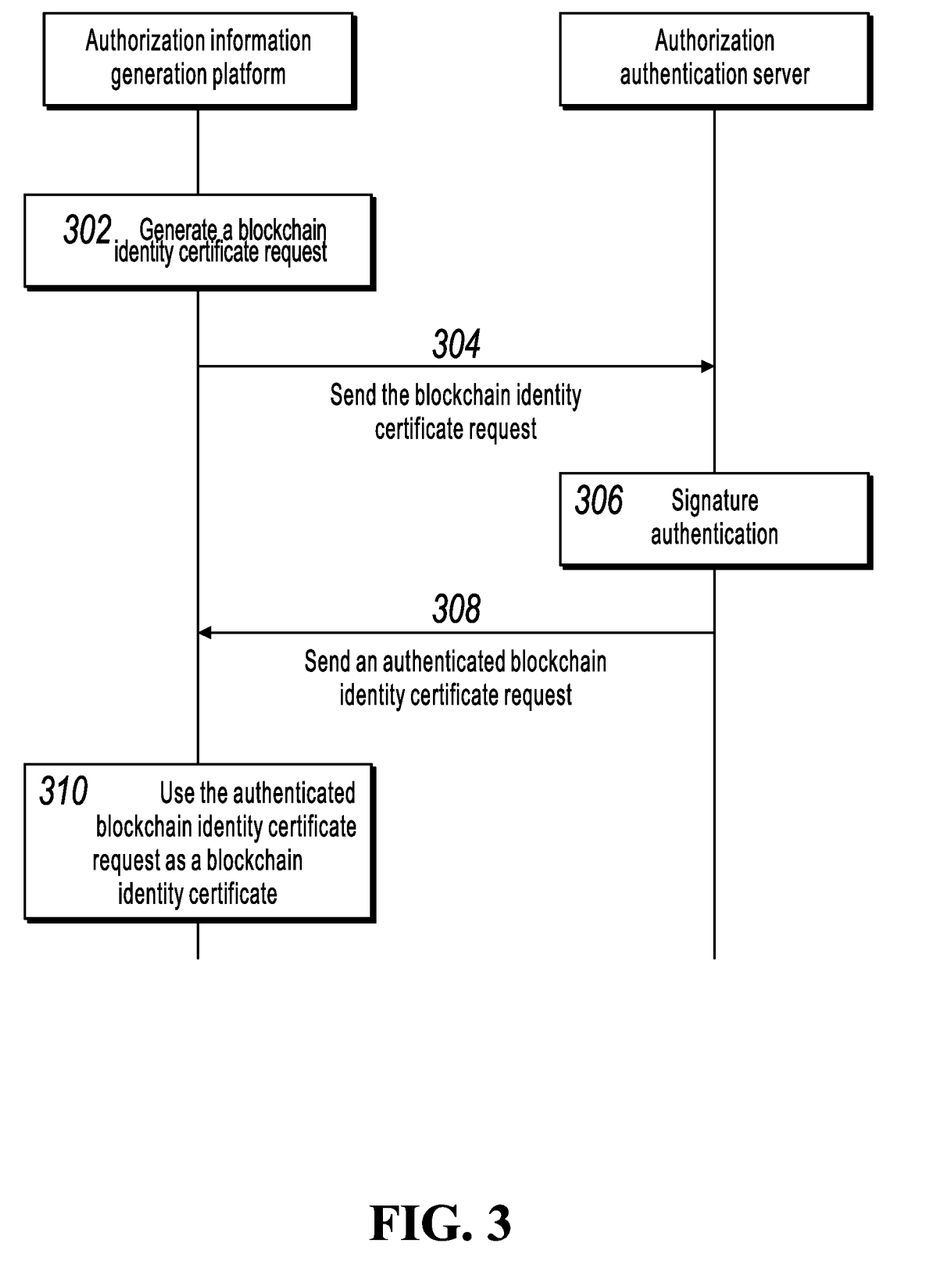
FIG. 3 is a flowchart illustrating an example blockchain identity certificate generation process in a method for generating blockchain authorization information, according to an implementation of the present disclosure.

FIG. 3 is a flowchart illustrating an application scenario of a blockchain identity certificate generation process in a method for generating blockchain authorization information, according to an implementation of the present disclosure.

Figure 4:
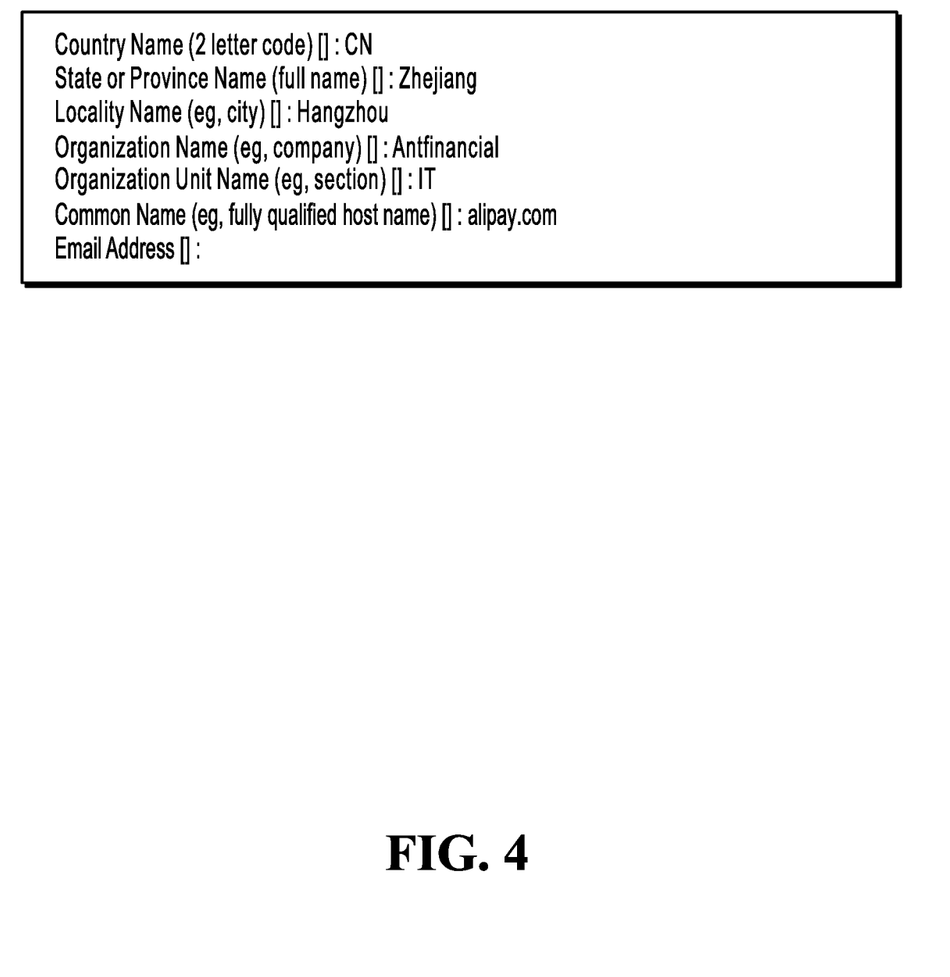
FIG. 4 shows an example blockchain identity certificate request generated in a method for generating blockchain authorization information, according to an implementation of the present disclosure.

As shown in FIG. 3, at block 302, an authorization information generation platform generates a blockchain identity certificate request based on user information by using a determined password generation algorithm. The blockchain identity certificate request includes the user information (some or all user information) and a public key generated based on the user information, and is a blockchain identity certificate that is not signature-authenticated. FIG. 4 shows an example of a blockchain identity certificate request. As shown in FIG. 4, the blockchain identity certificate request includes information such as a country code, a province name, a city name, a department name, a division name, and an FQDN.

When the authorization information generation platform is a trusted authoritative platform, the generated blockchain identity certificate request can be used as the blockchain identity certificate based on trust in the authorization information generation platform. Therefore, an authentication process performed by an additional authentication authority can be avoided, so not only efficiency can be improved, but also communication resources can be saved. In addition, the authorization information generation platform can further use the blockchain identity certificate request as a blockchain identity certificate after signing the blockchain identity certificate request. In another example, the signature process can be performed in the process of generating the blockchain identity certificate request.

To further improve security of the blockchain identity certificate generated for the client, in this implementation, after the blockchain identity certificate request is generated, the blockchain identity certificate request is sent to an authorization authentication server at block 304 to perform signature authentication. The authorization authentication server can be a third-party authentication authority (for example, a CA authority), or can be a blockchain administrator of a target blockchain. For a consortium blockchain, each blockchain can be configured with a blockchain administrator (e.g., a management server). The blockchain administrator can perform signature authentication on the blockchain identity certificate.

When receiving the blockchain identity certificate request, at block 306, the authorization authentication server performs signature authentication on the received blockchain identity certificate request. The signature-authenticated blockchain identity certificate request includes a signature of the authorization authentication server, and therefore becomes a formal blockchain identity certificate with public trust.

Then, at block 308, the authorization authentication server sends the signature-authenticated blockchain identity certificate request to the authorization information generation platform.

At block 310, the authorization information generation platform receives the signature-authenticated blockchain identity certificate request from the authorization authentication server, and uses the received signature-authenticated blockchain identity certificate request as the blockchain identity certificate.

Figure 5:
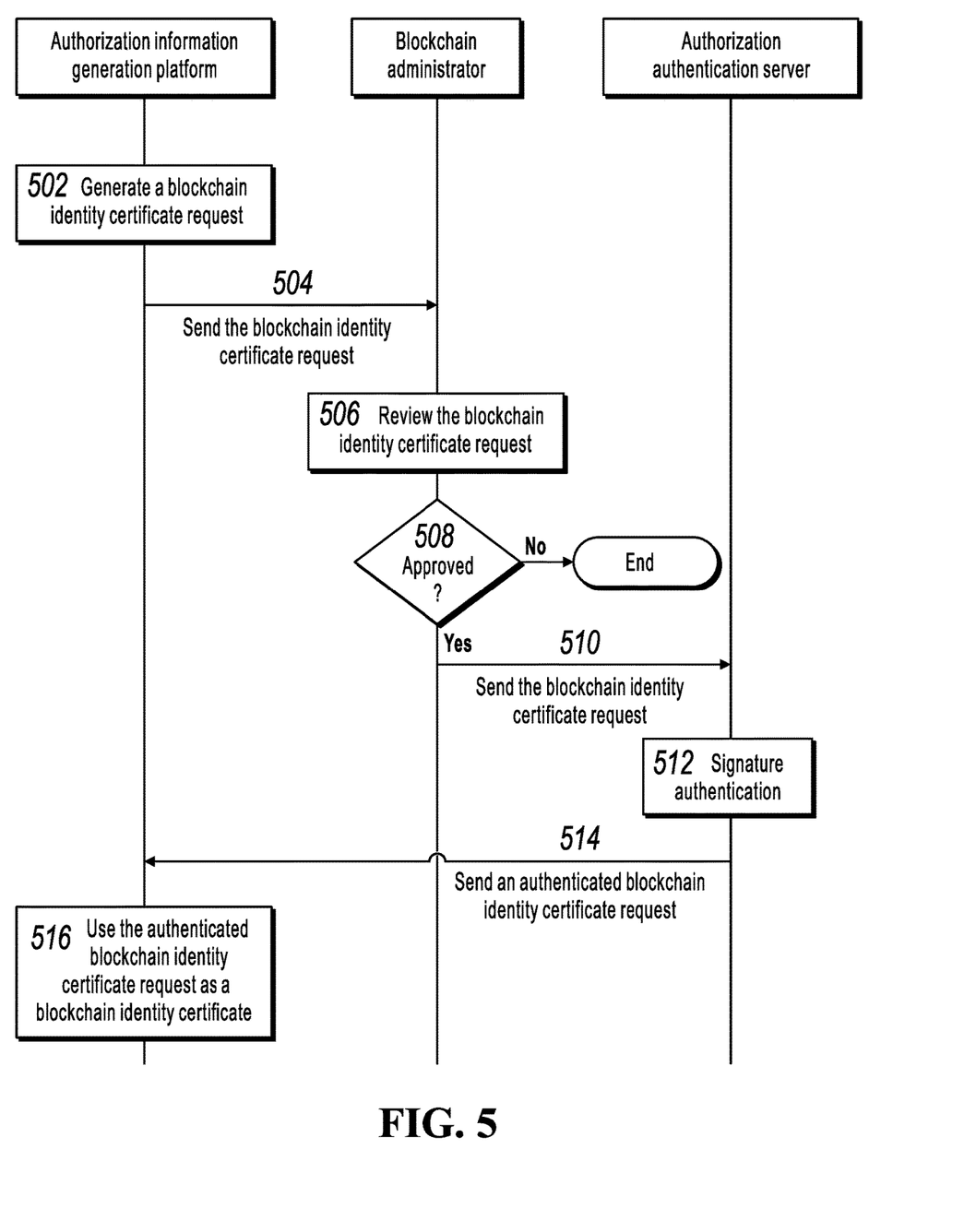
FIG. 5 is a flowchart illustrating another example blockchain identity certificate generation process in a method for generating blockchain authorization information, according to an implementation of the present disclosure.

FIG. 5 is a flowchart illustrating another example blockchain identity certificate generation process in a method for generating blockchain authorization information, according to an implementation of the present disclosure. In this example, an authorization authentication institution is a third-party authentication institution independent of a target blockchain and an authorization information generation platform.

As shown in FIG. 5, at block 502, the authorization information generation platform generates a blockchain identity certificate request based on user information by using a determined password generation algorithm.

At block 504, the authorization information generation platform sends the blockchain identity certificate request to an administrator of the target blockchain. At block 506 and block 508, the blockchain administrator of the target blockchain then reviews the received blockchain identity certificate request. The blockchain administrator can review format content of the blockchain identity certificate request to check whether the blockchain identity certificate request satisfies requirements.

When the blockchain identity certificate request is approved, at block 510, the blockchain administrator sends the approved blockchain identity certificate request to the authorization authentication server for signature authentication. If the blockchain identity certificate request is not approved, the blockchain administrator can return, to the authorization information generation platform, a notification message indicating that the blockchain identity certificate request is not approved. The notification message can also include a reason why the blockchain identity certificate request is not approved. When receiving the notification message, the authorization information generation platform can regenerate the blockchain identity certificate request and send it to the blockchain administrator for review.

After the blockchain identity certificate request is reviewed by the blockchain administrator, the security and reliability of the finally generated blockchain identity certificate can be ensured.

When receiving the blockchain identity certificate request, at block 512, the authorization authentication server performs signature authentication on the received blockchain identity certificate request. Then, at block 514, the authorization authentication server sends the signature-authenticated blockchain identity certificate request to the authorization information generation platform.

At block 516, the authorization information generation platform receives the signature-authenticated blockchain identity certificate request from the authorization authentication server, and uses the received signature-authenticated blockchain identity certificate request as the blockchain identity certificate.

A private key of each participant in the blockchain cannot be known by others; otherwise, transaction data written by the participant into the target blockchain can be tampered with. The private key generated by the authorization information generation platform can be obtained by others if no processing is performed, which will adversely affect the security of reading and writing transactions on the target blockchain by the client. Therefore, in an example, the blockchain authorization information generation request sent by the client can include private key encryption information.

Figure 6:
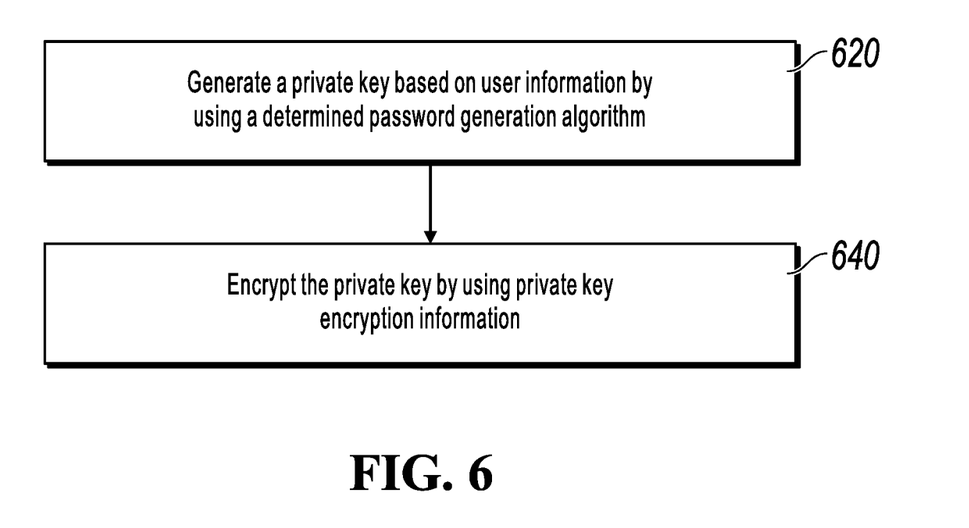
FIG. 6 is a flowchart illustrating an example private key generation process in a method for generating blockchain authorization information, according to an implementation of the present disclosure.

FIG. 6 is a flowchart illustrating an example private key generation process in a method for generating blockchain authorization information, according to an implementation of the present disclosure.

As shown in FIG. 6, at block 620, generate a private key based on user information by using a determined password generation algorithm.

Then, at block 640, encrypt the private key by using private key encryption information. A client can locally generate a private key encryption password by using a password generation tool, and send the private key encryption password together with a blockchain authorization information generation request. When an encrypted private key is sent to the client or downloaded by the client, the client can decrypt the private key by using a private key known by the client, so as to obtain the private key.

In another example, the blockchain authorization information generation request does not include the private key encryption information. In this case, the private key encryption process is not performed.

Figure 7:
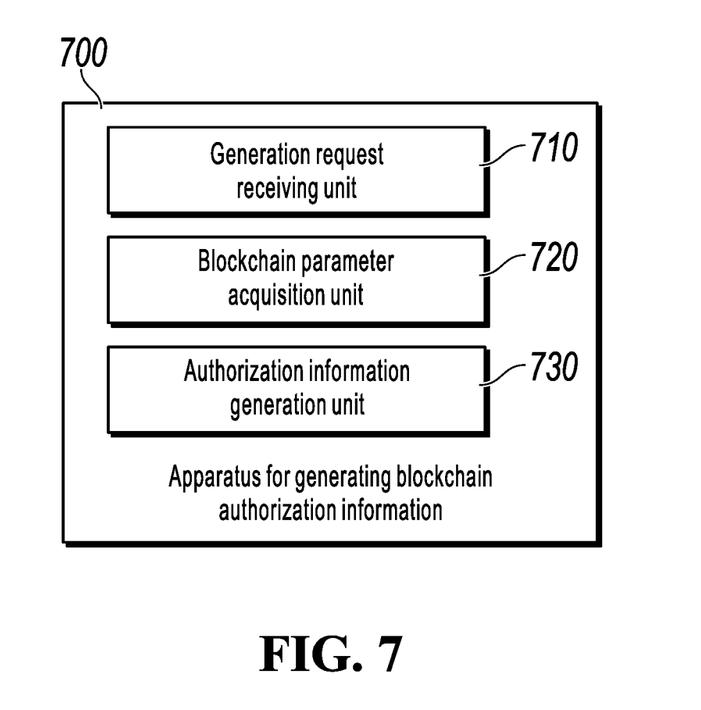
FIG. 7 is a structural block diagram illustrating an apparatus for generating blockchain authorization information, according to an implementation of the present disclosure.

FIG. 7 is a structural block diagram illustrating an apparatus for generating blockchain authorization information, according to an implementation of the present disclosure. As shown in FIG. 7, a blockchain authorization information generation apparatus 700 includes a generation request receiving unit 710, a blockchain parameter acquisition unit 720, and an authorization information generation unit 730.

The generation request receiving unit 710 is configured to receive a blockchain authorization information generation request that is sent by a client and that is used to request to generate blockchain authorization information, where the blockchain authorization information generation request includes a target blockchain identifier and user information.

The blockchain parameter acquisition unit 720 is configured to obtain a blockchain parameter that matches the target blockchain identifier. When the blockchain parameter is obtained, the authorization information generation unit 730 generates the blockchain authorization information based on the obtained blockchain parameter and the user information.

In addition, although not shown in the figure, the blockchain authorization information generation apparatus 700 can further include an authorization information sending unit. The authorization information sending unit is configured to send the generated blockchain authorization information to the client.

Figure 8:
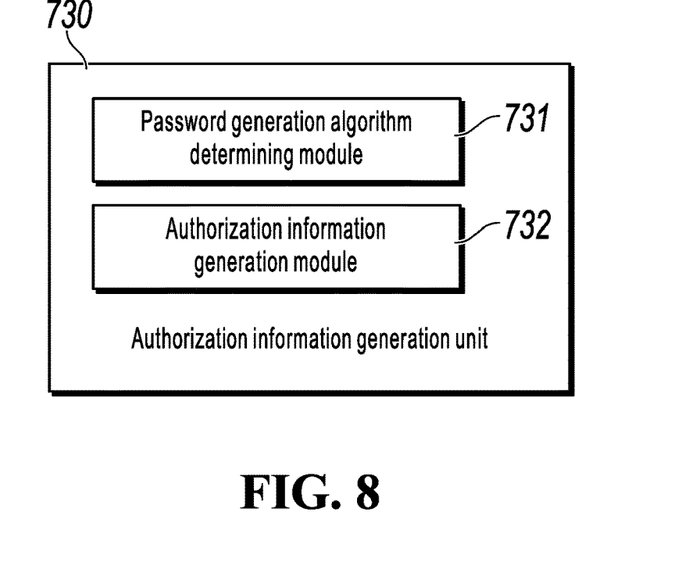
FIG. 8 is an example structural block diagram illustrating an authorization information generation unit in the apparatus for generating blockchain authorization information shown in FIG. 7.

FIG. 8 is an example structural block diagram illustrating an authorization information generation unit 730 in the apparatus 700 for generating blockchain authorization information shown in FIG. 7. As shown in FIG. 8, the authorization information generation unit 730 includes a password generation algorithm determining module 731 and an authorization information generation module 732.

The password generation algorithm determining module 731 is configured to determine, based on the obtained blockchain parameter, a password generation algorithm used to generate the blockchain authorization information. The authorization information generation module 732 is configured to generate the blockchain authorization information based on the user information by using the determined password generation algorithm.

Figure 9:
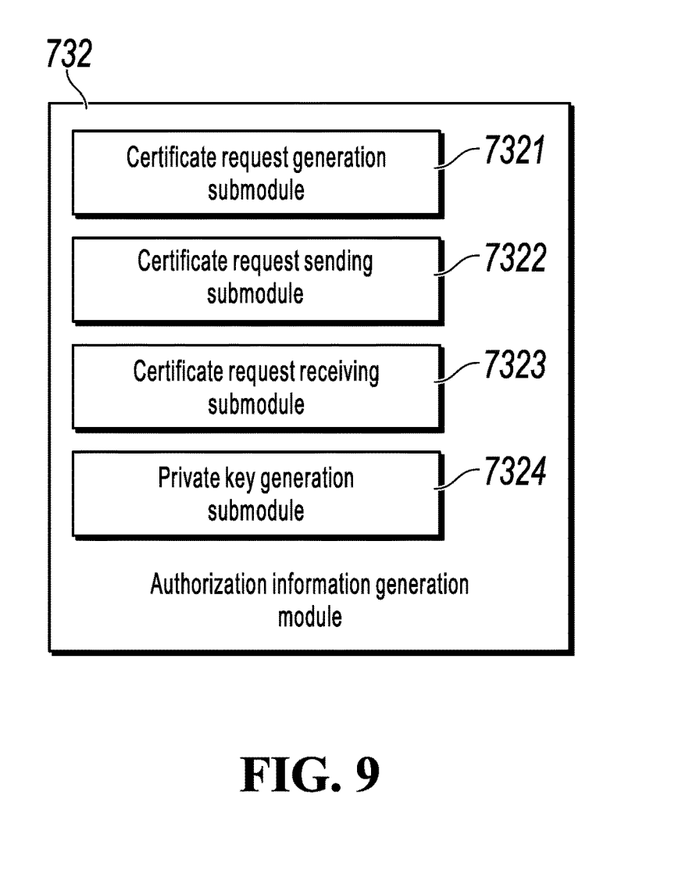
FIG. 9 is an example structural block diagram illustrating an authorization information generation module in the authorization information generation unit in the apparatus for generating blockchain authorization information shown in FIG. 8.

FIG. 9 is an example structural block diagram illustrating an authorization information generation module 732 in the authorization information generation unit shown in FIG. 8. In this example, the blockchain authorization information includes a blockchain identity certificate and a private key. As shown in FIG. 9, the authorization information generation module 732 includes a certificate request generation submodule 7321, a certificate request sending submodule 7322, a certificate request receiving submodule 7323, and a private key generation submodule 7324.

The certificate request generation submodule 7321 is configured to generate a blockchain identity certificate request based on user information by using a determined password generation algorithm. After the blockchain identity certificate request is generated, the certificate request sending submodule 7322 sends the blockchain identity certificate request to an authorization authentication server for signature authentication.

After performing signature authentication on the blockchain identity certificate request, the authorization authentication server sends the signature-authenticated blockchain identity certificate back to the blockchain authorization information generation apparatus 700. Then, the certificate request receiving submodule 7323 receives the signature-authenticated blockchain identity certificate request as the blockchain identity certificate from the authorization authentication server.

In another example, the certificate request sending submodule 7322 can send the blockchain identity certificate request to a blockchain administrator for review. After the blockchain identity certificate request is approved, the blockchain administrator sends the approved blockchain identity certificate request to the authorization authentication server.

In another example, the authorization information generation module 732 does not include the certificate request sending submodule 7322 and the certificate request receiving submodule 7323. In this case, the certificate request generation submodule 7321 can use the generated blockchain certificate request as the blockchain identity certificate for the client.

The private key generation submodule 7324 is configured to generate the private key based on the user information by using the determined password generation algorithm. In another example, the blockchain authorization information does not include the private key. In this case, the authorization information generation module does not include the private key generation module.

When the blockchain authorization information includes the private key, the blockchain authorization information generation request can further include private key encryption information. In this case, the authorization information generation apparatus 700 can further include a private key encryption unit (not shown in the figure). The private key encryption unit is configured to encrypt the private key by using the private key encryption information.

Figure 10:
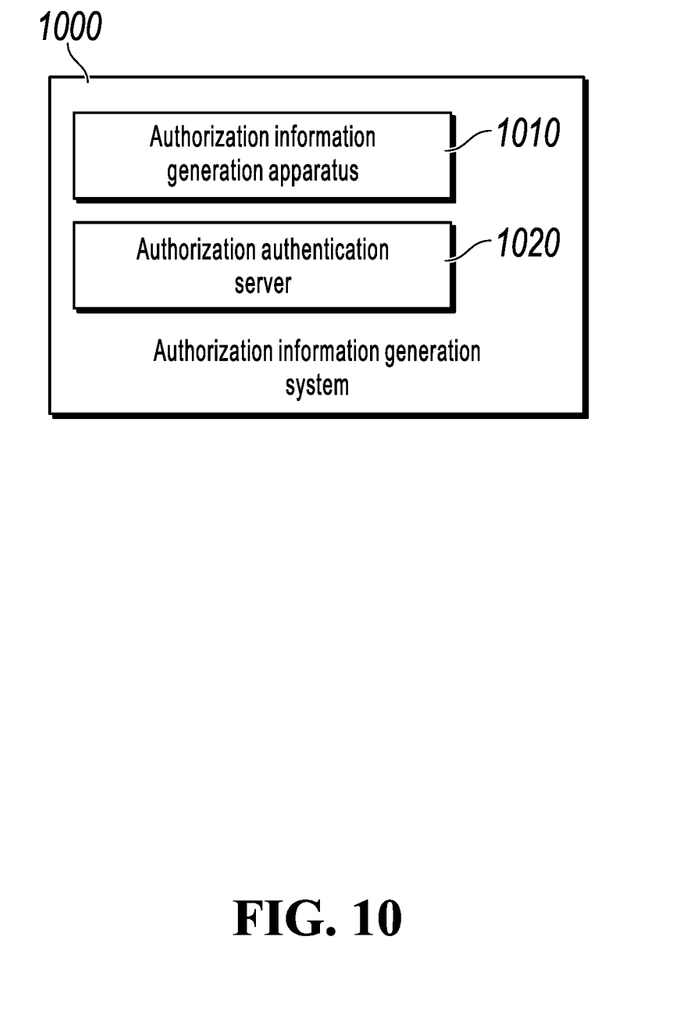
FIG. 10 is a structural block diagram illustrating a system for generating blockchain authorization information, according to an implementation of the present disclosure.

FIG. 10 is a structural block diagram illustrating a system for generating blockchain authorization information, according to an implementation of the present disclosure. As shown in FIG. 10, an authorization information generation system 1000 includes a blockchain authorization information generation apparatus 1010 and an authorization authentication server 1020.

The blockchain authorization information generation apparatus 1010 can have the functions described in the previous implementations. The authorization authentication server 1020 is configured to: after receiving a blockchain identity certificate request from the blockchain authorization information generation apparatus 1010 and performing signature authentication on the blockchain identity certificate request, send a signature-authenticated blockchain identity certificate request to the blockchain authorization information generation apparatus 1010.

Referring to FIG. 1 to FIG. 9, the previous describes the implementations of the method and the apparatus for generating blockchain authorization information according to the present disclosure. The details mentioned in the previous description of the method implementations are also applicable to the apparatus implementations of the present disclosure.

The disclosed apparatus for generating blockchain authorization information can be implemented by using hardware, or can be implemented by using software or a combination of hardware and software. The implementations in the present specification are described progressively, and same or similar parts of the implementations are referred to each other.

The disclosed apparatus for generating blockchain authorization information can be implemented by using hardware, or can be implemented by using software or a combination of hardware and software. Software implementation is used as an example. As a logical apparatus, the apparatus is formed by reading a corresponding computer program instruction in a storage to a memory by a processor of a device where the apparatus is located. In the present disclosure, the apparatus for generating blockchain authorization information can be implemented by using, for example, a computing device.

Figure 11:
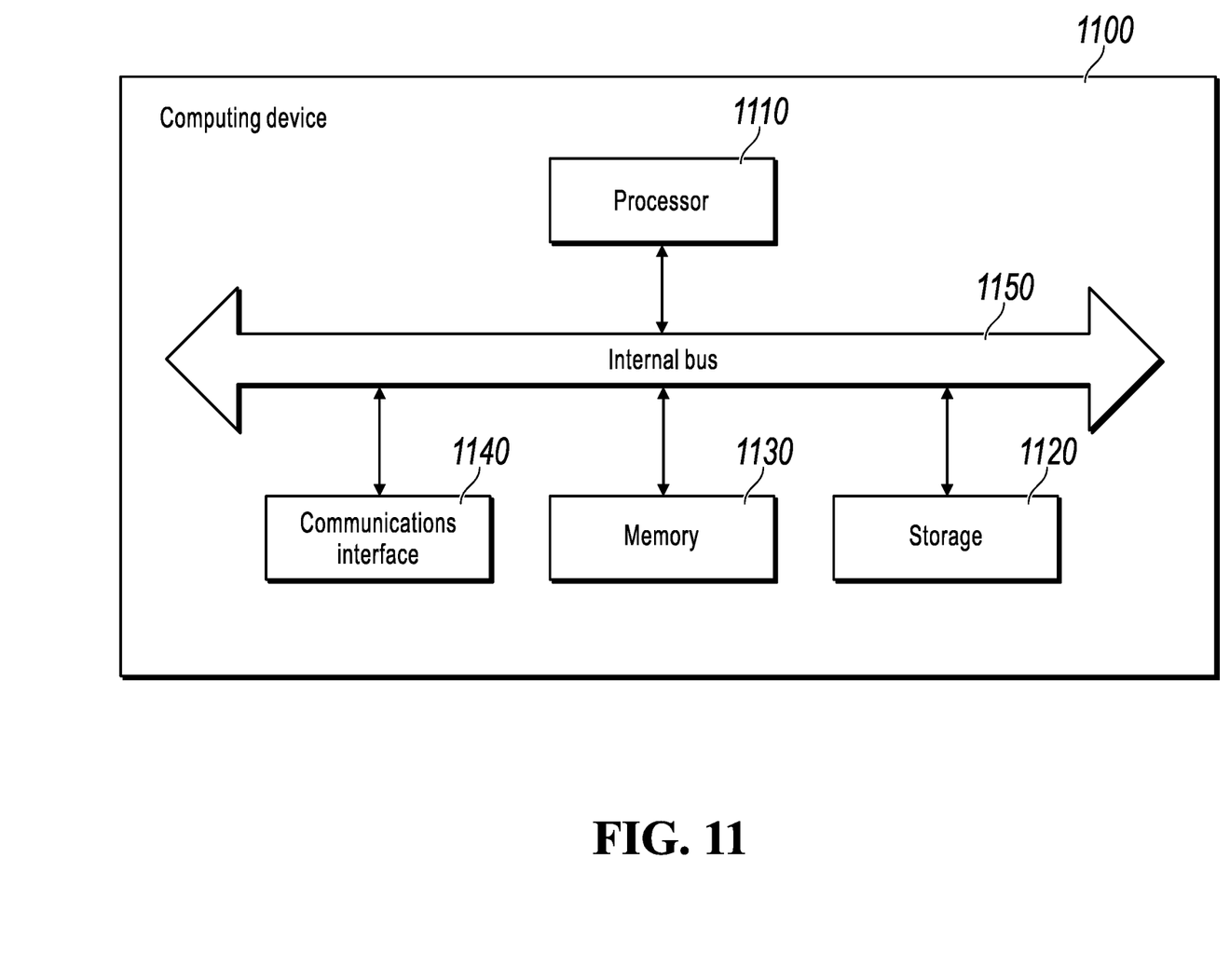
FIG. 11 is a structural block diagram illustrating a computing device in a method for generating blockchain authorization information, according to an implementation of the present disclosure.

FIG. 11 is a structural block diagram illustrating a computing device in a method for generating blockchain authorization information, according to an implementation of the present disclosure. As shown in FIG. 11, a computing device 1100 includes a processor 1110, a storage 1120, a memory 1130, a communications interface 1140, and an internal bus 1150. According to an implementation, the computing device 1100 can include at least one processor 1110 that executes at least one computer readable instruction (i.e., the previous elements implemented in software form) stored or encoded in a computer readable storage medium (i.e., storage 1120).

In an implementation, the storage 1120 stores computer executable instructions. When being executed, the computer executable instructions cause the at least one processor 1110 to: receive a blockchain authorization information generation request that is sent by a client and that is used to request to generate blockchain authorization information, where the blockchain authorization information generation request includes a target blockchain identifier and user information; obtain a blockchain parameter that matches the target blockchain identifier; and generate the blockchain authorization information based on the obtained blockchain parameter and the user information.

It should be understood that, when the computer executable instructions stored in the memory 1120 are executed, the at least one processor 1110 performs the previous operations and functions described with reference to FIG. 1 to FIG. 9 in the implementations of the present disclosure.

According to an implementation, a program product such as a non-transient machine readable medium is provided. The non-transient machine readable medium can have instructions (that is, the previous elements implemented in software form). When the instructions are executed by a machine, the machine performs the previous operations and functions described with reference to FIG. 1 to FIG. 9 in the implementations of the present disclosure.

Specifically, a system or apparatus equipped with a readable storage medium can be provided, and software program code for implementing a function of any one of the previous implementations is stored in the readable storage medium, so a computer or a processor of the system or apparatus reads and executes instructions stored in the readable storage medium.

In this case, the program code read from the readable medium can implement a function of any one of the previous implementations. Therefore, the machine readable code and the readable storage medium that stores the machine readable code constitute a part of the present disclosure.

Implementations of the readable storage medium include a floppy disk, a hard disk, a magneto-optical disk, an optical disc (such as a CD-ROM, a CD-R, a CD-RW, a DVD-ROM, a DVD-RAM, a DVD-RW), a magnetic tape, a non-volatile memory card, and a ROM. Optionally, program code can be downloaded from a server computer or cloud by a communications network.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Not all steps and units in the previous processes and system structure diagrams are required. Some steps or units can be ignored based on actual requirements. An execution sequence of each step is not fixed, and can be determined based on requirements. The apparatus structure described in the previous implementations can be a physical structure, or can be a logical structure, that is, some units can be implemented by a same physical entity, or some units can be implemented by multiple physical entities, or can be implemented jointly by some components in multiple independent devices.

The term "example" used throughout the present specification means "used as an example, an instance, or an illustration" and does not mean "preferred" or "advantageous" over other implementations. For the purpose of providing an understanding of the described technology, a specific implementation includes specific details. However, these techniques can be implemented without these specific details. In some examples, well-known structures and apparatuses are shown in block diagrams in order to avoid making it difficult to understand the concepts of the described implementations.

The previous describes in detail optional implementations of the implementations of the present disclosure with reference to the accompanying drawings. However, the implementations of the present disclosure are not limited to specific details in the previous implementations. Within a technical concept scope of the implementations of the present disclosure, multiple simple variations of the technical solutions of the implementations of the present disclosure can be made, and these simple variations are all within the protection scope of the implementations of the present disclosure.

The previous descriptions of the present disclosure are provided to enable any person of ordinary skill in the art to implement or use the present disclosure. It is obvious to a person of ordinary skill in the art that various modifications can be made to the present disclosure. In addition, the general principle defined in the present specification can be applied to another variant without departing from the protection scope of the present disclosure. Therefore, the present disclosure is not limited to the examples and designs described here, but is consistent with the widest range of principles and novelty features that conform to the disclosure.

What is claimed is:

1. A computer-implemented method, comprising:
   receiving, from a client device by a platform comprising one or more computing devices, a request to become a blockchain node in a target blockchain, wherein the request comprises a target blockchain identifier and user information;
   identifying, by the platform, based on the target blockchain identifier, the target blockchain;
   determining, by the platform, a blockchain parameter of the target blockchain, wherein the blockchain parameter indicates one or more requirements for authorization information to satisfy the request to become a blockchain node in the target blockchain;
   generating, by the platform, a blockchain identity certificate request based on the user information and the one or more requirements;
   sending, by the platform, the blockchain identity certificate request to an authentication server or to an administrator of the target blockchain for signature authentication;
   receiving, by the platform, from the authentication server, a signature-authenticated blockchain identity certificate request; and
   sending, by the platform, the signature-authenticated blockchain identity certificate request to at least one of the client device or the administrator of the target blockchain.

2. The computer-implemented method of claim 1, wherein the blockchain identity certificate request is sent by the platform to the administrator of the target blockchain, and wherein the blockchain identity certificate request is sent by the administrator of the target blockchain to the authentication server for signature authentication.

3. The computer-implemented method of claim 1, wherein generating the blockchain identity certificate request comprises generating the blockchain identity certificate request based on the user information using a password generation algorithm.

4. The computer-implemented method of claim 3, wherein the blockchain identity certificate request comprises a public key, and wherein generating the blockchain identity certificate request comprises generating the public key using the password generation algorithm.

5. The computer-implemented method of claim 1, wherein the one or more requirements comprise one or more of: a key format, a type of encryption algorithm used to generate the blockchain identity certificate request, or a type of user information to be included in the blockchain identity certificate request.

6. The computer-implemented method of claim 1, wherein the blockchain parameter of the target blockchain is stored locally at the platform.

7. The computer-implemented method of claim 1, comprising using the signature-authentication blockchain identity certificate request as a blockchain identity certificate that is distributed in the target blockchain.

8. A non-transitory, computer-readable medium storing one or more instructions that, when executed by a computer system, cause the computer system to perform operations comprising:
   receiving, from a client device, a request to become a blockchain node in a target blockchain, wherein the request comprises a target blockchain identifier and user information;
   identifying based on the target blockchain identifier, the target blockchain;
   determining a blockchain parameter of the target blockchain, wherein the blockchain parameter indicates one or more requirements for authorization information to satisfy the request to become a blockchain node in the target blockchain;
   generating a blockchain identity certificate request based on the user information and the one or more requirements;
   sending the blockchain identity certificate request to an authentication server or to an administrator of the target blockchain for signature authentication;
   receiving, from the authentication server, a signature-authenticated blockchain identity certificate request; and
   sending the signature-authenticated blockchain identity certificate request to at least one of the client device or the administrator of the target blockchain.

9. The non-transitory, computer-readable medium of claim 8, wherein the blockchain identity certificate request is sent to the administrator of the target blockchain, and wherein the blockchain identity certificate request is sent by the administrator of the target blockchain to the authentication server for signature authentication.

10. The non-transitory, computer-readable medium of claim 8, wherein generating the blockchain identity certificate request comprises generating the blockchain identity certificate request based on the user information using a password generation algorithm.

11. The non-transitory, computer-readable medium of claim 10, wherein the blockchain identity certificate request comprises a public key, and wherein generating the blockchain identity certificate request comprises generating the public key using the password generation algorithm.

12. The non-transitory, computer-readable medium of claim 8, wherein the one or more requirements comprise one or more of: a key format, a type of encryption algorithm used to generate the blockchain identity certificate request, or a type of user information to be included in the blockchain identity certificate request.

13. The non-transitory, computer-readable medium of claim 8, wherein the blockchain parameter of the target blockchain is stored locally at an authorization information generation platform.

14. The non-transitory, computer-readable medium of claim 8, wherein the operations comprise using the signature-authentication blockchain identity certificate request as a blockchain identity certificate that is distributed in the target blockchain.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, from a client device, a request to become a blockchain node in a target blockchain, wherein the request comprises a target blockchain identifier and user information;
identifying based on the target blockchain identifier, the target blockchain;
determining a blockchain parameter of the target blockchain, wherein the blockchain parameter indicates one or more requirements for authorization information to satisfy the request to become a blockchain node in the target blockchain;
generating a blockchain identity certificate request based on the user information and the one or more requirements;
sending the blockchain identity certificate request to an authentication server or to an administrator of the target blockchain for signature authentication;
receiving, from the authentication server, a signature-authenticated blockchain identity certificate request; and
sending the signature-authenticated blockchain identity certificate request to at least one of the client device or the administrator of the target blockchain.

16. The computer-implemented system of claim 15, wherein the blockchain identity certificate request is sent to the administrator of the target blockchain, and wherein the blockchain identity certificate request is sent by the administrator of the target blockchain to the authentication server for signature authentication.

17. The computer-implemented system of claim 15, wherein generating the blockchain identity certificate request comprises generating the blockchain identity certificate request based on the user information using a password generation algorithm.

18. The computer-implemented system of claim 17, wherein the blockchain identity certificate request comprises a public key, and wherein generating the blockchain identity certificate request comprises generating the public key using the password generation algorithm.

19. The computer-implemented system of claim 15, wherein the one or more requirements comprise one or more of: a key format, a type of encryption algorithm used to generate the blockchain identity certificate request, or a type of user information to be included in the blockchain identity certificate request.

20. The computer-implemented system of claim 15, wherein the blockchain parameter of the target blockchain is stored locally at an authorization information generation platform.

21. The computer-implemented system of claim 15, wherein the operations comprise using the signature-authentication blockchain identity certificate request as a blockchain identity certificate that is distributed in the target blockchain.

* * * * *